United States Patent [19]

Cairns et al.

[11] 3,969,082

[45] July 13, 1976

[54] APPARATUS FOR PURIFYING EXHAUST WASTE GASES

[75] Inventors: James Anthony Cairns, Wantage; Richard Stuart Nelson, Goring on Thames; Stanley Frederick Pugh, Abingdon, all of England

[73] Assignee: United Kingdom Atomic Energy Authority, London, England

[22] Filed: July 2, 1973

[21] Appl. No.: 375,773

[30] Foreign Application Priority Data

Mar. 30, 1973 United Kingdom............... 15579/73

[52] U.S. Cl. .......................... 23/288 FC; 23/288 F; 23/288 FB
[51] Int. Cl.² ...................... F01N 3/15; F01N 7/04
[58] Field of Search ...... 23/288 FC, 288 F, 288 FB; 423/213.2, 213.5

[56] References Cited
UNITED STATES PATENTS

| | | |
|---|---|---|
| 3,208,131 | 9/1965 | Ruff et al....................... 23/288 FC |
| 3,259,454 | 7/1966 | Michalko....................... 23/288 FC |
| 3,362,783 | 1/1968 | Leak.............................. 23/288 FC |
| 3,410,651 | 11/1968 | Brandenburg et al. ......... 23/288 FC |
| 3,471,413 | 10/1969 | Hervert.............................. 252/463 |
| 3,773,894 | 11/1973 | Bernstein et al................ 23/288 FC |

OTHER PUBLICATIONS

"Rare Earth Elements", Encyclopedia of Chem. Tech. Kirk–Othmer, vol. 17, pp. 160-161, 1968 (2nd Edition).

*Primary Examiner*—Morris O. Volk
*Assistant Examiner*—Bradley Garris
*Attorney, Agent, or Firm*—Larson, Taylor and Hinds

[57] ABSTRACT

An apparatus for purifying exhaust waste gases including a catalytic element comprising a substrate of metal carrying a surface layer compatible with and supporting a coating of catalytic material, a major proportion of the surface coating of catalytic material comprising an unagglomerated atomic dispersion. An example of such a substrate is an aluminum bearing ferritic steel which has been heat treated in air to form an essentially alumina surface layer.

11 Claims, 2 Drawing Figures

APPARATUS FOR PURIFYING EXHAUST WASTE GASES

BACKGROUND OF THE INVENTION

The invention relates to the manufacture of catalysts. The invention is a development of that described in an application of Cairns et al having common assignee and filed on the same date and entitled "Improvements in the manufacture of catalysts" which describes, inter alia, a method for use in the manufacture of a catalyst, which method comprises driving at a substrate surface a substantially atomic dispersion of a material which is catalytic, or which is a component of a catalytic system, to attach onto the substrate surface without agglomeration a major proportion of the atoms of the material impinging thereon.

Our aforesaid application further describes a specific method embodying the invention in which platinum is deposited onto a porous alumina substrate by ion beam sputtering.

There is a wide range of applications for catalysts such as may be manufactured by the said method. Some examples of such applications, in addition to hydrogenation, are in gas burners, isomerisation, applications currently using base metal to avoid the expense of noble metal catalysts, treatment of gaseous effluents, car exhaust treatment systems, and ignition devices.

In considering some of these applications, it is apparent that the choice of substrate can play an important part in optimising the performance of the catalytic system. A particular problem, for example, is the need for car exhaust treatment systems to withstand a severe environment and repeated thermal cycling throughout the operating lifetime of the system.

There are also indications that, for platinum, alumina is a particularly suitable substrate.

The present invention is concerned with providing for the catalytic material a substrate support which can be adapted to meet specialised operating criteria, such as, for example, a severe environment and thermal cycling.

SUMMARY OF THE INVENTION

According to the present invention the method of our aforesaid application is applied to deposit a material which is catalytic, or which is a component of a catalytic system, onto a substrate comprising a metal carrying a surface layer, such as alumina, compatible with the said material. An example of such a substrate is an aluminium bearing ferritic steel which has been heat treated in air to form an essentially alumina surface layer.

In this latter case, the present invention makes use of a remarkable property of catalytic material deposited by this method. This property is that the catalytic material is deposited in a highly active form, substantially as an atomic dispersion and under such controllable conditions that the deposition of redundant material in any part of the area over which the material is dispersed can be avoided or significantly reduced in comparison with conventional deposition. Consequently, a small exposed surface area of the substrate coated with catalytic material is capable of exhibiting a performance equivalent to a much larger exposed surface area of a substrate coated with catalytic material in a conventional manner.

It will be appreciated that the alumina surface layer upon an aluminium bearing ferritic steel will have traces included with it of iron and any other elements alloyed with the steel. Such a composition is intended to be encompassed by the expression "an essentially alumina surface layer".

Preferably the substrate comprises an alloy of iron, chromium, aluminium and yttrium with proportions by weight lying preferably in the range up to 15% chromium, 0.5 to 12% aluminium and 0.1 to 3% yttrium, and the balance of iron.

Aluminium bearing ferritic steels have the property of forming an alumina layer on heating in air and the alumina layer protects the steels against further oxidation attack. Such steels have the threefold advantage in their use according to the present invention in their inherent resistance to corrosion, their provision of an alumina surface which is particularly suitable as a substrate support for catalytic material, and in that any cracks formed in the alumina as a consequence of thermal cycling are self-healing on heating in air.

The specified iron, chromium, aluminium, yttrium alloy, known as Fecraloy has further advantages. Thus, the alumina film is more stable and more adherent than films of alumina on more conventional aluminium bearing ferritic steels. Fecraloy is extremely ductile at elevated temperatures so that its resistance to shock and fracture under severe thermal cycling makes the material mechanically acceptable for use in treatment of effluent, such as car exhaust fumes. Fecraloy is also suitable for use in carbon dioxide and steam environments.

Experiments illustrating the manufacture and performance of examples embodying the invention will now be described.

Prior to deposition of catalytic material, Fecraloy discs were heated in air at about 1000°C for about 24 hours. Platinum was then deposited upon the discs by the method of our aforesaid application.

One of the striking features of this deposition process is that the platinum exhibits remarkable specific activity. This not only allows very low coverage catalysts to be prepared, but, in fact, it emerges that there is often little to be gained by increasing the platinum loading. Thus, for example, in one experiment, using the catalyst for the oxidation of carbon monoxide, it was found that the catalytic activity, as measured by the percentage conversion of carbon monoxide with increasing temperature, was maintained over a range of catalyst loadings from 8 micrograms per square centimeter to 0.6 micrograms per square centimeter.

It is to be observed that Fecraloy could not be used so readily as a support for catalytic material deposited by a conventional technique. It would be necessary to provide a surface coating which would increase the exposed surface area, such as for example by wash coating with alumina.

A catalyst system for car exhaust treatment will now be described by way of example and with reference to the accompanying drawings, in which:

FIG. 1 illustrates a catalyst mounted upon a Fecraloy substrate manufactured as follows:

Fecraloy comprising 15% chromium, 4% aluminum 0.3% yttrium and the remainder iron is rolled to sheet 2 inches wide and 0.0025 inches thick.

A length of this sheet is corrugated with 0.040 inch corrugations and, together with a plane sheet of corresponding length is oxidised in air at 1000°C for 24 hours.

The corrugated and flat sheets are then coated separately on both sides by sputtering from a platinum target using an argon ion beam.

The sputtering is continued until the platinum deposited corresponds to an essentially monatomic layer.

Figure 1:
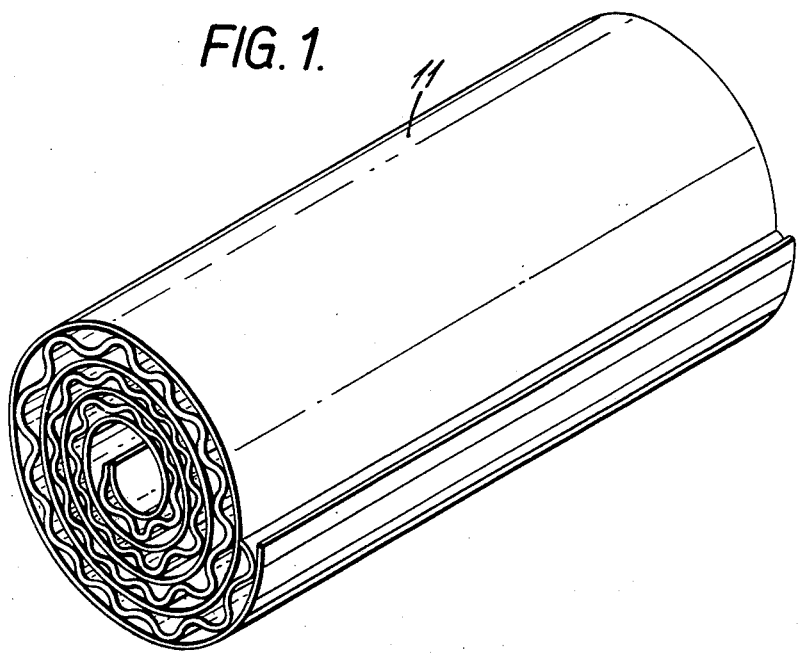
FIG. 1 is a diagrammatic perspective view of a catalyst.

The corrugated sheet is then laid on top of the plane sheet and, after spot welding at the ends, the combined sheets are rolled up into the shape shown in FIG. 1.

Figure 2:
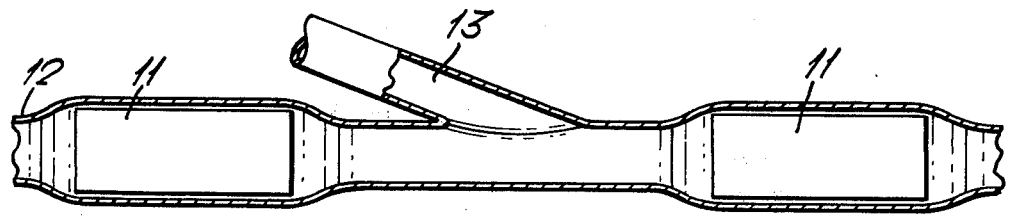
FIG. 2 is a diagrammatic sectional view of the exhaust gas treatment system.

FIG. 2 illustrates an exhaust catalyst system for treatment of exhaust gases from an internal combustion engine. Two catalyst cylinders 11 are employed.

Exhaust gas leaving the engine manifold enters at 12 and contacts the first catalyst cylinder under reducing conditions in which oxides of nitrogen are catalytically reduced to nitrogen and oxygen.

To oxidise carbon monoxide it is necessary to introduce oxygen and this is achieved, in this example, by a pumped supply of air into pipeline 13. The exhaust gases thus contact the second catalyst cylinder under oxidising conditions in which carbon monoxide is catalytically oxidised to carbon dioxide.

A catalyst cylinder as described has been tested for carbon monoxide oxidation in the exhaust system of an internal combustion petrol engine. Over 90 per cent conversion of the effluent carbon monoxide has been achieved at a very high displacement rate in excess of 100,000 displacements per hour.

After more than 100 hours of running the Fecraloy showed no visual sign of mechanical deterioration. The catalyst system also withstands thermal cycling up to 1100°C.

After these tests a small portion of the Fecraloy support together with the catalyst was removed for laboratory tests, in which the supported catalyst was used for the oxidation of carbon monoxide. The catalyst was found to exhibit a start up temperature of 200°C and complete conversion at 250°C, indicating that there had been no deterioration in performance after the 100 hours engine test.

Further, tests of the effect of poisons upon the catalysts of the foregoing examples have shown that the poisoning by hydrogen sulphide, sulphur dioxide and thiophene is no more severe than found with conventional catalysts under oxidising conditions.

We claim:

1. Apparatus for catalytic purification of waste exhaust gases of an internal combustion engine, which apparatus comprises: a housing providing a catalytic reaction chamber; inlet means for supplying air and exhaust gases to said chamber; outlet means for gases to exit from said chamber; and a catalytic element in said chamber, said catalytic element including a metal alloy substrate having an alumina surface layer, upon which surface layer a layer of catalytic material has been deposited, said alloy principally comprising iron with additions of chromium, aluminium and yttrium, the alloy substrate having the essentially alumina surface layer formed on the substrate by heat treatment of the metal alloy substrate in an oxidizing atmosphere to form the alumina surface layer from aluminium in the metal alloy substrate, and wherein, the major proportion of said layer of catalytic material comprises an unagglomerated atomic dispersion thereof.

2. Apparatus as claimed in claim 1, wherein said catalytic material comprises sputtered metal deposited upon said alumina surface layer.

3. Apparatus as claimed in claim 1, wherein said alloy comprises up to 15% by weight chromium, 0.5 to 12% by weight aluminium, 0.1 to 3% by weight yttrium and the balance iron.

4. Apparatus as claimed in claim 1, wherein said catalytic material comprises platinum.

5. Apparatus as claimed in claim 1 wherein said catalytic material comprises a noble metal.

6. Apparatus for catalytic purification of waste exhaust gases of an internal combustion engine, which apparatus comprises: a housing providing a catalytic reaction chamber; inlet means for supplying air and exhaust gases to said chamber; outlet means for gases to exit from said chamber; and a catalytic element in said chamber, said catalytic element including a metal alloy substrate having an alumina surface layer, upon which surface layer a layer of catalytic material has been deposited, said alloy principally comprising with additions of chromium, aluminium and yttrium, the alloy substrate having the essentially alumina surface layer formed on the substrate by heat treatment of the metal alloy substrate in an oxidizing atmosphere to form the alumina surface layer from aluminium in the metal alloy substrate, and wherein said layer of catalytic material comprises a platinum layer, the major proportion of said platinum layer comprising an unagglomerated atomic dispersion of platinum formed by sputtering platinum onto the alumina surface layer.

7. Apparatus as claimed in claim 6, wherein said alloy comprises up to 15% by weight chromium, 0.5 to 12% by weight aluminium, 0.1 to 3% by weight yttrium and the balance iron.

8. Apparatus for catalytic purification of waste exhaust gases of an internal combustion engine, which apparatus comprises: a housing providing first and second catalytic reaction chambers connected in series; inlet means for supplying exhaust gases to the first chamber for passage through both said first and said second chambers; inlet means for supplying air to said second chamber; outlet means for gases to exit from said second chamber; and first and second catalytic elements respectively in said first and second chambers, each catalytic element including a metal alloy substrate having an alumina surface layer, upon which surface layer a layer of catalytic material has been deposited, said alloy principally comprising iron with additions of chromium, aluminium, and yttrium, the alloy substrate having the essentially alumina surface layer formed on the substrate by heat treatment of the metal alloy substrate in an oxidizing atmosphere to form the alumina surface layer from aluminium in the metal alloy substrate, and wherein, the major proportion of said layer of catalytic material comprises an unagglomerated atomic dispersion thereof.

9. Apparatus as claimed in claim 8, wherein said catalytic material comprises sputtered metal deposited upon said alumina surface layer.

10. Apparatus as claimed in claim 8, wherein said alloy comprises up to 15% by weight chromium, 0.5 to 12% by weight aluminium, 0.1 to 3% by weight yttrium and the balance iron.

11. Apparatus as claimed in claim 8, wherein said catalytic material comprises platinum.

\* \* \* \* \*